United States Patent [19]

Briese

[11] Patent Number: 4,477,211
[45] Date of Patent: Oct. 16, 1984

[54] ROTARY TOOL CUTTING CARTRIDGE

[76] Inventor: Leonard A. Briese, 5039 Browndeer La., Rancho Palos Verdes, Calif. 90274

[21] Appl. No.: 346,948

[22] Filed: Feb. 8, 1982

Related U.S. Application Data

[63] Continuation of Ser. No. 129,904, Mar. 13, 1980, abandoned.

[51] Int. Cl.³ .......................... B23C 5/20; B23C 5/24
[52] U.S. Cl. ...................................................... 407/7
[58] Field of Search .......................... 407/7, 46, 101; 82/36 A

[56] References Cited

U.S. PATENT DOCUMENTS

| | | | |
|---|---|---|---|
| 2,054,311 | 9/1936 | Adams | 407/7 |
| 2,230,455 | 2/1941 | Githens | 407/7 |
| 2,383,958 | 9/1945 | Devlieg | 407/7 |
| 2,403,405 | 7/1946 | Sirola | 82/36 A |
| 2,551,167 | 5/1951 | Rolland | 407/7 |
| 2,885,766 | 5/1959 | Ernst et al. | 407/7 |
| 3,329,065 | 7/1967 | Vaughn | 407/7 |
| 3,515,029 | 6/1970 | Gambini | 407/7 |
| 4,181,049 | 1/1980 | Borisenko et al. | 407/7 |

FOREIGN PATENT DOCUMENTS 649507  2/1979  U.S.S.R. .................................. 407/7

Primary Examiner—Leonidas Vlachos
Assistant Examiner—Jerry Kearns
Attorney, Agent, or Firm—Eric T. S. Chung

[57] ABSTRACT

An improved cutting cartridge for rotary cutting tools is disclosed. The cutting cartridges are designed to be disposable and serve to permit the rotary cutting tools to be cheaply and quickly equipped with new cutting inserts without substantial effort, cost, or extensive time. The cutting cartridge essentially consists of a stator which is retained on a rotary cutting tool adapted to receive it. A rotor and a cutting insert are rotatably assembled on the stator and appropriately retained thereon.

3 Claims, 7 Drawing Figures

ROTARY TOOL CUTTING CARTRIDGE

This application is a continuation of application Ser. No. 06/129,904, filed Mar. 13, 1980 and now abandoned.

BACKGROUND OF THE INVENTION

1. Field of the Invention

The present invention is directed to rotary cutting tools. More particularly, the present invention concerns removal and replacement of the cutting elements or inserts used for rotary cutting tools.

2. Description of the Prior Art

Rotary cutting tools are characterized by the use of round cutting inserts which take the shape of a flat washer and which serve as the cutting surfaces of the rotary cutting tool. A representative example of such rotary cutting tools is disclosed in U.S. Pat. Re. No. 26,637.

Characteristically, the cutting inserts are mounted on a base portion of a rotary cutting tool to rotate about their own central longitudinal axis when operationally placed in contact with a workpiece. The rotation of the inserts is caused by friction between the cutting inserts and the workpiece and is continuous for as long as the cutting tool and the workpiece are in contact with each other. The speed of rotation of the insert is controllable by adjusting the radial rake of the cutting inserts.

In general, increasing the radial rake of a cutting insert will serve to increase the speed of rotation of the cutting insert and increase the dissipation of heat attendant to operation of a rotary cutting tool. Higher speeds are usually involved when the rotary cutting tool is used with harder materials, whether milling, cathing or boring is being done.

Prior art rotary cutting tools have involved the cutting inserts being mounted on the cutting surface of the tool by the use of a bolt or the like extending through the center of the insert and into a protruding base portion of the rotary cutting tool. Rotation of each cutting insert about its longitudinal axis has been accommodated by the use of a variety of bearings and bushings which are mounted with the cutting inserts on the supporting portion of the rotary cutting tool.

In the past, replacement of damaged or dulled cutting inserts would involve a major disassembly of a rotary cutting tool. Such disassembly procedure is time consuming, inconvenient, generally costly, and can involve a substantial waste of maching operating time. Having duplicate tools is not desireable from the standpoint of cost.

OBJECTS AND SUMMARY OF THE INVENTION

It is accordingly a primary object of the present invention to provide cutting cartridges that permit new cutting inserts for rotary cutting tools to be easily, quickly, and cheaply replaced or installed.

It is another object of the present invention to provide cutting cartridges for rotary cutting tools that allow the tools to be quickly adapted to have the cutting inserts rearranged to have the tool operated in either a positive rake mode or a negative rake mode.

It is a further object of the present invention to provide a cutting cartridge for rotary cutting tools that is disposable.

More particularly, cutting cartridges in accordance with the subject invention essentially include a stator having a rotor and a cutting insert rotatably mounted thereon. The stator is configured to have a base and spindle portion which are appropriately lodged on and secured to a rotary cutting tool for operation.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 7 is a top view of a rotary cutting tool generally illustrating the manner in which cutting cartridges are mounted thereon.

Referring to FIGS. 1 and 2 of the drawings, the principle elements of a cutting cartridge in accordance with the invention are a stator 2, a rotor 4, and a cutting insert 6.

Figure 1:
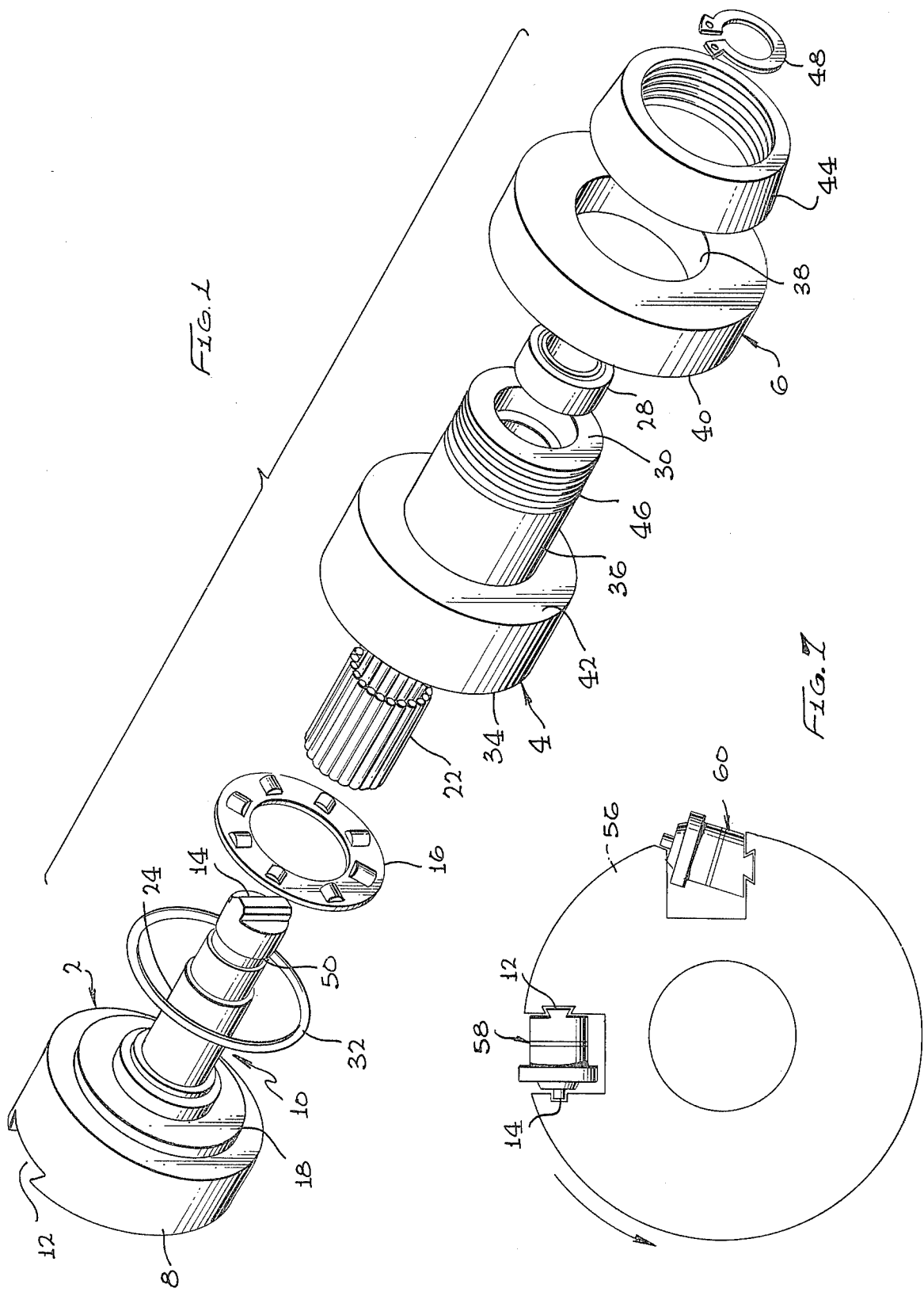
FIG. 1 is an exploded perspective view of a cutting cartridge in accordance with the invention.

The stator 2 is configured to have a base portion 8 and a spindle portion 10 which serves to receive and have mounted thereon the rotor 4 in a fashion that is described in greater detail hereinafter.

Referring briefly to FIG. 7, a cutting cartridge is mounted on a rotary cutting tool by having the end 12 of the base 8 and the end 14 of the spindle 10 situated in gaps provided in the rotary cutting tool to receive a cutting cartridge. As shown, the base 8 of the stator 2 may be shaped to form one-half of a dovetail junction to permit simple mounting of the end 12 of the cutting cartridge on a rotary cutting tool. The end 14 of the spindle 10 may be appropriately flattened, pointed or otherwise shaped to snugly fit into a corresponding gap provided in the rotary cutting tool to receive the spindle 10. Conventional means of securing the cutting cartridge in the gaps, such as with clips, screws, and the like, may be used.

The end 12 of the base 8 may be shaped to have the male portion of the dovetail junction as shown in FIGS. 2 through 6 or the female portion of the dovetail junction as shown in FIG. 1.

Referring once again to FIGS. 1 and 2, the rotor 4 is mounted on the spindle 10 of the stator 2 in a manner to permit concentric rotation about the longitudinal axis of the spindle 10. Accordingly, a thrust bearing 16 is situated against a platform 18 of the base 8 to receive an abutting interior shoulder 20 of the rotor 4. Needle bearings 22 are situated around a central portion 24 of the spindle 10 to snugly receive and support a central longitudinal surface 26 of the rotor 4.

A third ball bearing 28 is situated just inwardly of the end 14 of the spindle 10. It snugly receives the interior end surface 30 of the rotor 4.

An O-ring 32 may be used to seal the lower end of the interior cavity formed between the stator 2 and the rotor 4 by being placed and sized to be snugly fit around the outer periphery of the platform 18 on the base 8 of the stator 2. The diameter of the O-ring 32 should be appropriately sized to close the gap between the base 8 of the stator 2 and the inner edge 34 of the rotor 4 adjacent said base 8 of the stator 2.

As an alternative to the O-ring 32, a C-ring may be used to facilitate the insertion and changing of the seal as may be necessary. A high temperature composite material may be used.

The cutting insert 6 is mounted on a spindle portion 36 of the rotor 4 by simply having the central opening 38 thereof situated around the spindle 36 of the rotor 4. The inner diameter of the central opening 38 may be slightly greater than the outer diameter of the spindle 36. One face 40 of the cutting insert is positioned to abut an outer shoulder portion 42 of the rotor 4. The cutting insert 6 is retained in such position around the spindle 36 and against the shoulder 42 of the rotor 4 by the use of a threaded nut 44 which is threaded on threads 46 formed for this purpose at the end of the spindle 36 of the rotor 4.

A curved snap ring 48 may be fitted into a groove 50 near the end 14 of the spindle 10 of the stator 2 to ensure that the assembled cutting cartridge remains assembled.

Figure 2:
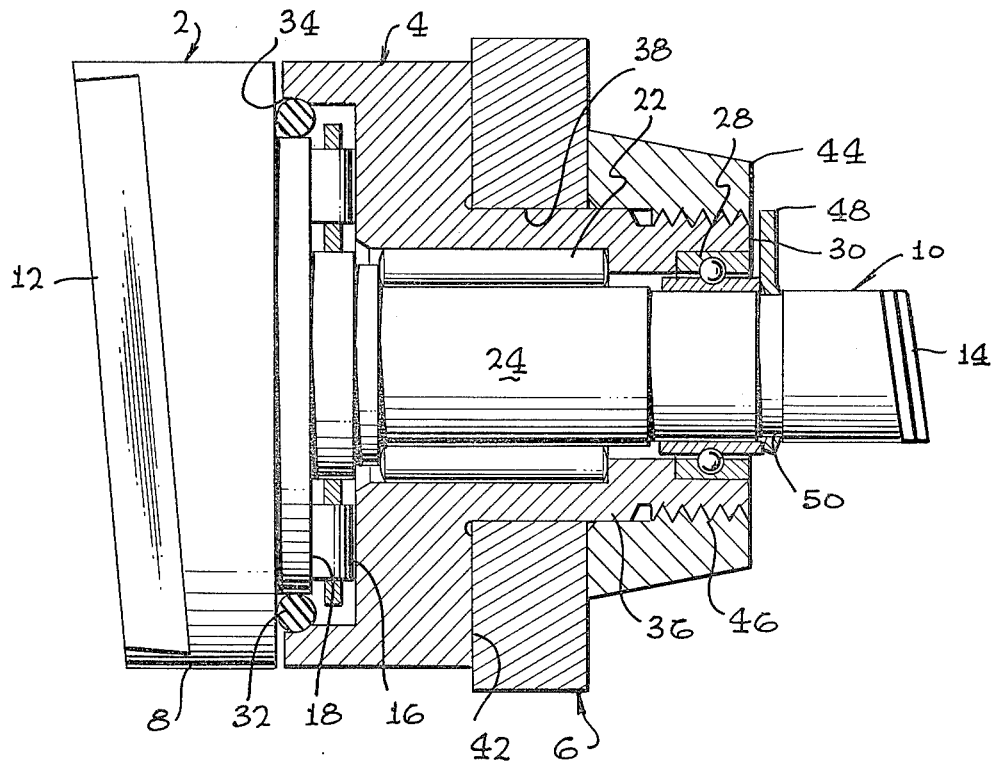
FIG. 2 is a side cross-sectional view of a cutting cartridge in accordance with the invention.
Figure 3:
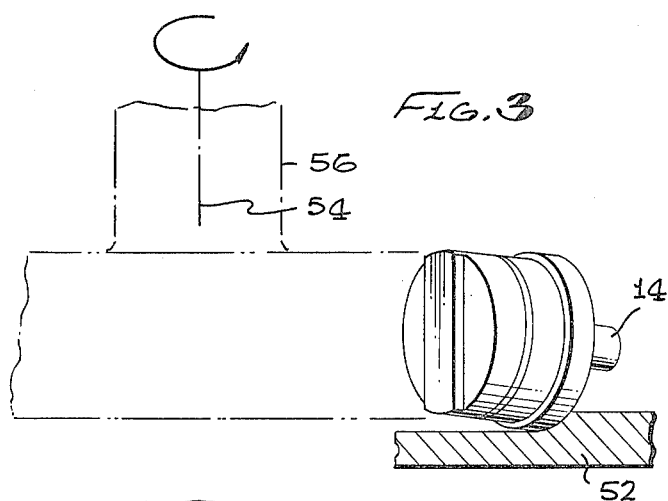
FIGS. 3 and 4 are perspective and side views, respectively, of a cutting cartridge situated to be operated in a negative rake mode.
Figure 4:
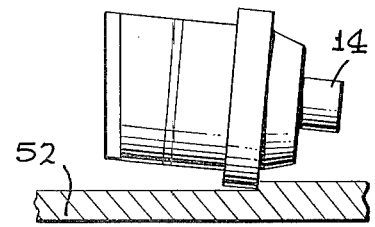

As previously discussed, the end 12 of the stator 2 serves as one connection to a rotary cutting tool by forming one half of the dovetail junction. Referring now to FIGS. 2, 3, and 4, it can be observed that the end 12 can be cut and shaped to have the end surface form a non-perpendicular angle with the longitudinal axis of the stator 2. The result would be to have the cutting cartridge canted in relation to the longitudinal axis of a milling tool and to a workpiece 52 as shown in FIGS. 3 through 6.

Referring to FIGS. 3 and 4, the cutting cartridge in accordance with the present invention is illustrated in a negative axial rake mode. As shown, a negative axial rake mode is characterized by the end 14 of the stator 2 generally pointing towards the workpiece 52.

Figure 5:
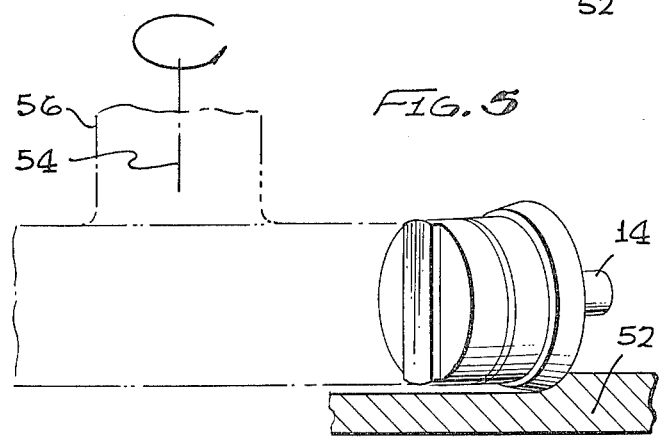
FIGS. 5 and 6 are perspective and side views, respectively, of a cutting cartridge situated to be operated in a positive rake mode.
Figure 6:
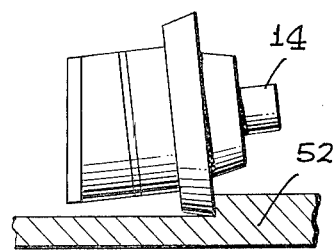

By comparison, the cutting cartridge is illustrated in a positive axial rake mode in FIGS. 5 and 6. As shown, a positive axial rake mode is characterized by the end 14 of the stator 2 generally pointing away from the workpiece 52.

As shown in FIGS. 3 and 5, both positive and axial rake and negative axial rake modes can be accomplished by having the portion of the dovetail junction formed on the rotary cutting tool situated parallel to the longitudinal axis 54 of the rotary cutting tool 56, such that the cutting cartridge will always be mounted thereon with its longitudinal axis at an angle to the surface of the workpiece 52.

Referring to FIG. 7, it can be observed that radial rake can also be controlled by appropriately forming the dovetail junction at the end 12. As shown, cutting cartridge 58 is mounted on a cutting tool 56 to have negative radial rake. A cutting cartridge 60 is shown with a greater negative radial rake. Clearly, positive radial rake would result if the cartridges 58 and 60 were turned by 180 degrees around the longitudinal axis thereof and mounted on the tool 56.

The elements of the cutting cartridge as described hereinabove may be manufactured by using conventional prior art technology. The various elements of the cutting cartridge may be made of metal with the exception of the O-ring 32 which may be made of high temperature composite material that is commerically available and the cutting insert 6 which is normally made with carbide, steel, or other suitable material.

From the foregoing description it is now clear that cutting cartridges, in accordance with the present invention, are a unitary element that may be readily installed and removed from a rotary cutting tool such as the milling tool graphically illustrated in FIGS. 3, 5 and 7. The ease with which the cutting cartridges may be installed and removed permits a machine shop to simply maintain an inventory of cutting cartridges which may have different rakes and which are maintained with new cutting inserts. The result would be to have rotary cutting tools readily serviced to provide the desired means and method of metal working.

It is to be understood that a variety of different cutting inserts may be used with the cutting cartridges in accordance with the present invention in a manner consistent with the state of the art.

It is to be further understood that cutting cartridges in accordance with the present invention, may be used on lathing tools and boring tools as well as with milling tools as illustrated in the drawings included herewith.

While a preferred embodiment of the present invention has been described hereinabove, it is intended that all matter contained in the above description and shown in the accompanying drawings be interpreted as illustrative and not in a limiting sense and that all modifications, constructions, and arrangements which fall within the scope and spirit of the invention may be made.

What is claimed is:

1. A rotary cutting tool comprising:
    a tool head having mounted thereon one of more individually mounted and removable, self-contained cutting cartridges, each cutting cartridge including a stator having a base portion and a spindle portion which are adapted to be fit onto said tool head, and a cutting insert rotatably mounted on said spindle portion, said base portion and said spindle portion serving to rotatably mount said cutting insert on said tool head, said base portion having a first half of a dovetail junction, said tool head having a second half of a dovetail junction adapted to receive said base portion in either of a first or second direction, said dovetail junction on said base portion having a precut angular orientation providing said cutting insert with a preset positive rake when said stator is slip mounted on said tool head in said first direction and a preset negative rake when said stator is slip mounted on said tool head in said second direction, said spindle portion having a tongue shaped end, said tool head having a groove, said tongue shaped end of said spindle portion being seated in said groove when said cutting cartridge is mounted on said tool head said tongue and groove being in alignment with said dovetail junction and means for securing said cutting cartridge in said tool head.

2. The rotary cutting tool defined in claim 1, said cutting cartridge further including:
    a rotor rotatably mounted on the spindle portion of said stator; and
    a cutting insert fixedly mounted on said rotor.

3. The rotary cutting tool defined by claim 1, said cutting cartridge further including:
    bearing means interposed between said stator and said rotor to permit rotation of said rotor on said stator wherein said cutting insert is affixed on said rotor and rotated with said rotor; and
    means for affixing said cutting insert on said rotor.

* * * * *